United States Patent
Telang et al.

(10) Patent No.: US 12,217,096 B2
(45) Date of Patent: Feb. 4, 2025

(54) MULTI-CLOUD DEPLOYMENT STRATEGY BASED ON ACTIVITY WORKLOAD

(71) Applicant: International Business Machines Corporation, Armonk, NY (US)

(72) Inventors: Vaibhav Telang, Pune (IN); Shailendra Moyal, Pune (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 17/304,948

(22) Filed: Jun. 29, 2021

(65) Prior Publication Data

US 2022/0413932 A1     Dec. 29, 2022

(51) Int. Cl.
*G06F 9/50* (2006.01)

(52) U.S. Cl.
CPC .......... *G06F 9/5072* (2013.01); *G06F 9/5038* (2013.01); *G06F 9/505* (2013.01)

(58) Field of Classification Search
None
See application file for complete search history.

(56) References Cited

U.S. PATENT DOCUMENTS

| | | | | |
|---|---|---|---|---|
| 9,015,099 B2 * | 4/2015 | Nitz | ....................... | G06N 5/046 706/45 |
| 11,272,011 B1 * | 3/2022 | Laughton | ................ | G06F 30/13 |
| 2014/0279201 A1 | 9/2014 | Iyoob | | |
| 2020/0410418 A1 * | 12/2020 | Martynov | ............. | G06F 16/122 |
| 2022/0091903 A1 * | 3/2022 | Bai | ........................... | G06F 8/60 |

OTHER PUBLICATIONS

Authors et. al.: Disclosed Anonymously, "A method and system of intelligent Cloud PaaS offering recommendation for application deployment", An IP.com Prior Art Database Technical Disclosure, IP.com No. IPCOM000236764D, IP.com Electronic Publication Date: May 15, 2014, 9 pages.
Authors et. al.: Disclosed Anonymously, "Creating a Bill of Material for large IT projects using cognitive maps", An IP.com Prior Art Database Technical Disclosure, IP.com No. IPCOM000254280D, IP.com Electronic Publication Date: Jun. 18, 2018, 5 pages.
Authors et. al.: Disclosed Anonymously, "Workload Discovery and Recommendations for Cloud Migration with AI", An IP.com Prior Art Database Technical Disclosure, IP.com No. IPCOM000263649D, IP.com Electronic Publication Date: Sep. 23, 2020, 13 pages.
Wen et al., "Cost Effective, Reliable and Secure Workflow Deployment over Federated Clouds", Journal of Latex Class Files, vol. 13, No. 9, Sep. 2014, DOI 10.1109/TSC.2016.2543719, IEEE Transactions on Services Computing, 13 pages.

* cited by examiner

*Primary Examiner* — Eric C Wai
(74) *Attorney, Agent, or Firm* — Stephen R. Yoder

(57) ABSTRACT

Multi-cloud deployment strategy is based on automated analysis of context and requirements for an activity workload. The activity workload is defined by user input including information regarding project cost, performance requirements, and geographical preferences. Selection of cloud-based resources for handling the activity workload is based in part on service availability record, projected cost of resources, and physical geographic locations. A cloud services registry provides cloud service provider data for selection to perform aspects of the activity workload.

17 Claims, 6 Drawing Sheets

MULTI-CLOUD DEPLOYMENT STRATEGY BASED ON ACTIVITY WORKLOAD

BACKGROUND

The present invention relates generally to the field of cloud computing deployment, and more particularly to multi-cloud deployment strategy for selecting cloud service providers.

The term "multi-cloud deployment" refers to the presence of more than one cloud deployment of the same type (public or private), sourced from different cloud service providers. Multi-cloud is different than hybrid cloud deployment, which refers to the presence of multiple deployment types (public or private) with some form of integration or orchestration between them.

Multi-cloud deployments often involve the distribution of cloud assets, software, and applications across several cloud-hosting environments. While a multi-cloud deployment can refer to any implementation of multiple cloud offerings such as software as a service (SaaS) and platform as a service (PaaS), today, multi-cloud deployment generally refers to a mix of public infrastructure as a service (IaaS) cloud environments where users access infrastructure components such as compute, storage, and networking. For deployments directed to PaaS component, infrastructure such as servers, storage, and networking is available as well as middleware, development tools, business intelligence (BI) services, and database management systems.

Multi-cloud deployment is a strategy where an organization leverages two or more cloud computing platforms to perform various tasks. Organizations that do not want to depend on a single cloud service provider may choose to use resources from several cloud service providers to get the best benefits from each unique service.

In computing, a workload is typically any program or application that runs on any computer. The term "workload," however, can also refer to the amount of work, or load, that software imposes on the underlying computing resources. Broadly stated, the workload of an activity is related to the amount of time and computing resources required to perform the activity or to produce an output from inputs provided. A light workload accomplishes its intended tasks or performance goals using relatively little computing resources, such as processors, CPU (central processing unit) clock cycles, and storage I/O (input/output). A heavy workload demands significant amounts of computing resources, which often includes various types of resources.

The activity performed under a workload varies widely depending on the complexity and intended purpose of the application. For example, a web server application might gauge workload by the number of webpages the server delivers per second, while other applications might gauge workload by the number of transactions accomplished per second with a specific number of concurrent network users.

Workloads may be classified as static or dynamic. A static workload such as an operating system (OS), email system, enterprise resource planning (ERP), and customer relationship management (CRM) run continuously. Dynamic workloads are ephemeral, running only when needed. Examples of dynamic workloads include temporary instances spun up to test software or applications that perform periodic audits or reporting activities.

SUMMARY

In one aspect of the present invention, a method, a computer program product, and a system includes: identifying a computing activity to be performed by multi-cloud deployment; determining activity workload requirements; identifying a set of candidate cloud service providers based on the activity workload requirements and the working context; mapping workload components and services using multi-cloud deployment models; determining a top-rated multi-cloud deployment strategy; and responsive to an approval action and user feedback regarding the top-rated multi-cloud deployment strategy, updating the multi-cloud deployment models in view of the approval action and the user feedback.

DETAILED DESCRIPTION

Figure 1:
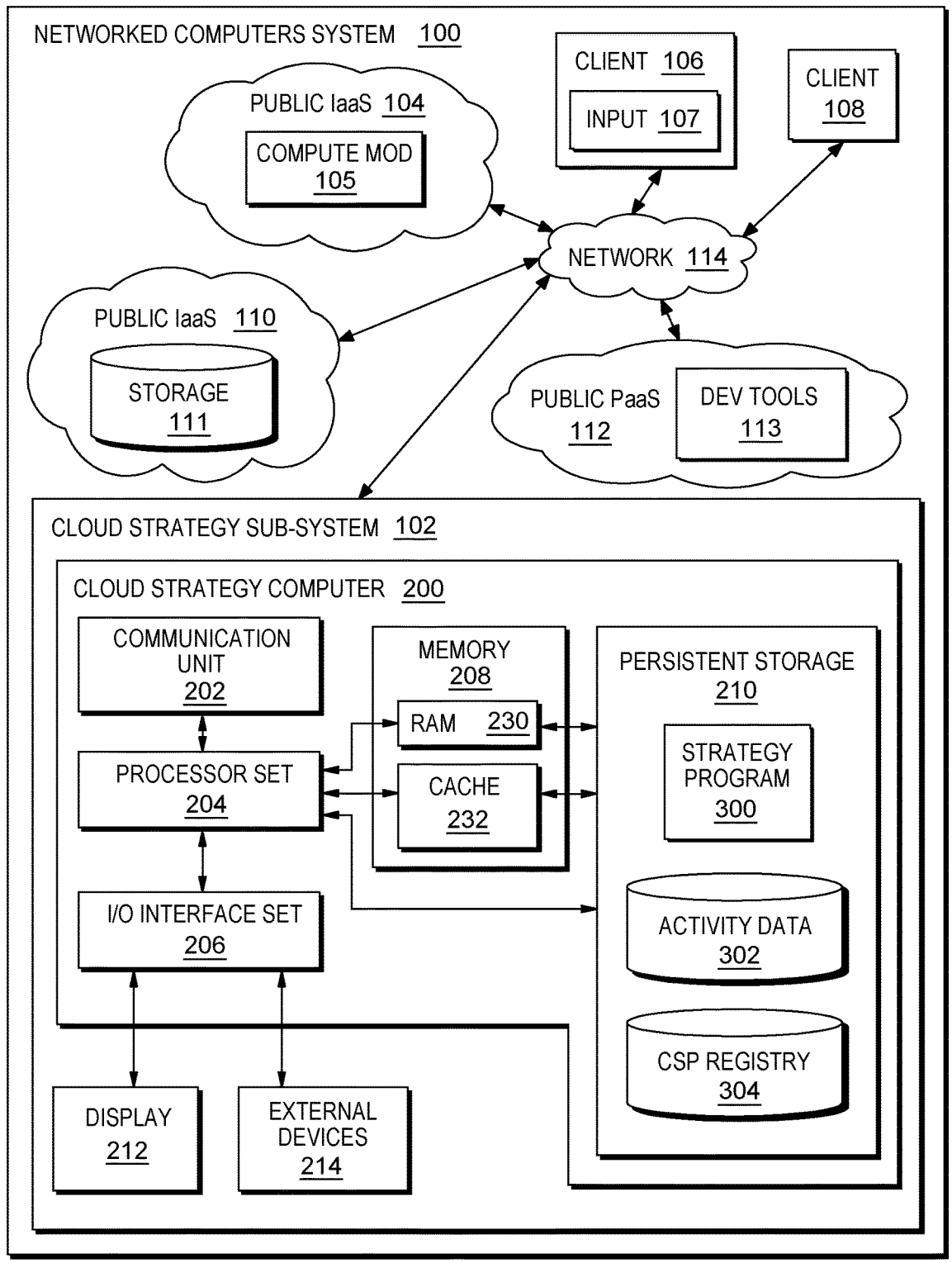
FIG. 1 is a schematic view of a first embodiment of a system according to the present invention.

Multi-cloud deployment strategy is based on automated analysis of context and requirements for an activity workload. The activity workload is defined by user input including information regarding project cost, performance requirements, and geographical preferences. Selection of cloud-based resources for handling the activity workload is based in part on service availability record, projected cost of resources, and physical geographic locations. A cloud services registry provides cloud service provider data for selection to perform aspects of the activity workload. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: multi-cloud deployment strategy sub-system 102; public IaaS (infrastructure as a service) cloud sub-system 104; cloud compute component 105; client sub-system 106; input module 107; client sub-system 108; public IaaS cloud sub-system 110; cloud storage component 111; public PaaS (platform as a service) cloud sub-system 112; developer tools application 113; communication network 114; multi-cloud deployment strategy computer 200; communication unit 202; processor set 204; input/output (I/O) interface set 206; memory device 208; persistent storage device 210; display device 212; external device set 214; random access memory (RAM) devices 230; cache memory device 232; multi-cloud deployment strategy program 300; activity workflow data store 302; and cloud service provider registry 304.

Sub-system 102 is, in many respects, representative of the various client computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Public cloud sub-systems 104, 110, and 112 make up the example multi-cloud computing environment for reference with respect to some embodiments of the present invention. Accordingly, each depicted cloud sub-system is controlled by a different cloud service provider having independent and sometimes unique offerings such as cloud compute component 105, cloud storage services such as storage component 111, and developer tools application 113. As described in detail below, the various cloud services are evaluated for use in handling aspects of an activity workload.

Multi-cloud deployment strategy program 300 operates to evaluate cloud service options for performing certain aspects a target activity workload for efficient use of a multi-cloud environment. Activity workloads are analyzed for context and various requirements such as cost and geographic location. Activity workload context may include type of user activity, type of business, and/or geographic considerations. Strategy program maps the cloud components across various cloud services of the multi-cloud environment to take a top-rated deployment action based on the available input for the particular activity workload.

Some embodiments of the present invention recognize the following facts, potential problems and/or potential areas for improvement with respect to the current state of the art: (i) one reason for selecting a cloud platform is that you "pay as you go," meaning that the user only pays for the services consumed; (ii) computer-implemented activities are often conducted across multiple cloud service providers in pursuit of operational benefits; (iii) computer-implemented activities are often conducted across multiple cloud service providers in pursuit of cost benefits; (iv) there is a need to identify at run time which multi-cloud deployment strategy will best suit individual needs at the time a target computing activity is taking place; (v) identifying a preferred multi-cloud deployment strategy at run time is possible using current micro-services and containerized technologies; (vi) dynamic deployment taking into account the latest CSP offerings and qualities improves efficiency in selecting service providers to perform certain activity workloads; and/or (vii) cloud environments provide unique advantages for movement of workloads because services can be deployed and/or redeployed on-demand due to platform standardization.

There are many applications that support users in selecting a cloud service provider based on their particular needs. Available recommendation tools identify cloud service providers according to inputs provided such as existing application architecture and the need for server virtualization. However, when the user adopts a particular cloud service provider, the selected cloud service provider remains in place until a next review of needs is performed to identify a preferred service provider and the migration of workloads begins all over again when the identified provider is different than the current provider. Cost/benefits for cloud service providers may change frequently, that is to say, the cloud service provider that was the most beneficial choice six months back may no longer be the most beneficial choice. Further, there may be additional service providers or different options available which were not considered earlier when selecting the preferred cloud service provider.

Some embodiments of the present invention are directed to facilitating deployment of an activity workload to the most efficient service provider as the default option is particularly effective for non-production workloads such as development and/or test instances. Determining a most efficient service provider is based on pre-defined characteristics or parameters and/or value comparison of pre-defined metrics. According to some embodiments of the present invention, the parameters of interest include: (i) service availability record; (ii) projected cost; (iii) performance ratings; and (iv) geographic location. For example, for activities in the web application lifecycle such as testing, deploying, or updating, activity workloads are established using inputs provided by users such that deployment strategies can be determined using components from different cloud service providers providing an overall efficient approach to resource usage when performing the activity.

An example implementation maps the parameter inputs from contributing cloud service providers with a given activity workload. Analysis of the mapping results in a recommendation for certain cloud service providers along with a deployment model for the activity workload. Once the workload has been analyzed and the services deployment need is calculated with number of API calls being made, the system derives the best permutation or combination of a cloud component/service deployment strategy. Recommendations for preferred deployment are dynamically provided to the user at the start of the activity according to real-time service conditions. In that way, the preferred cloud component/service deployment strategy satisfies the input parameters based on user expectations.

Figure 2:
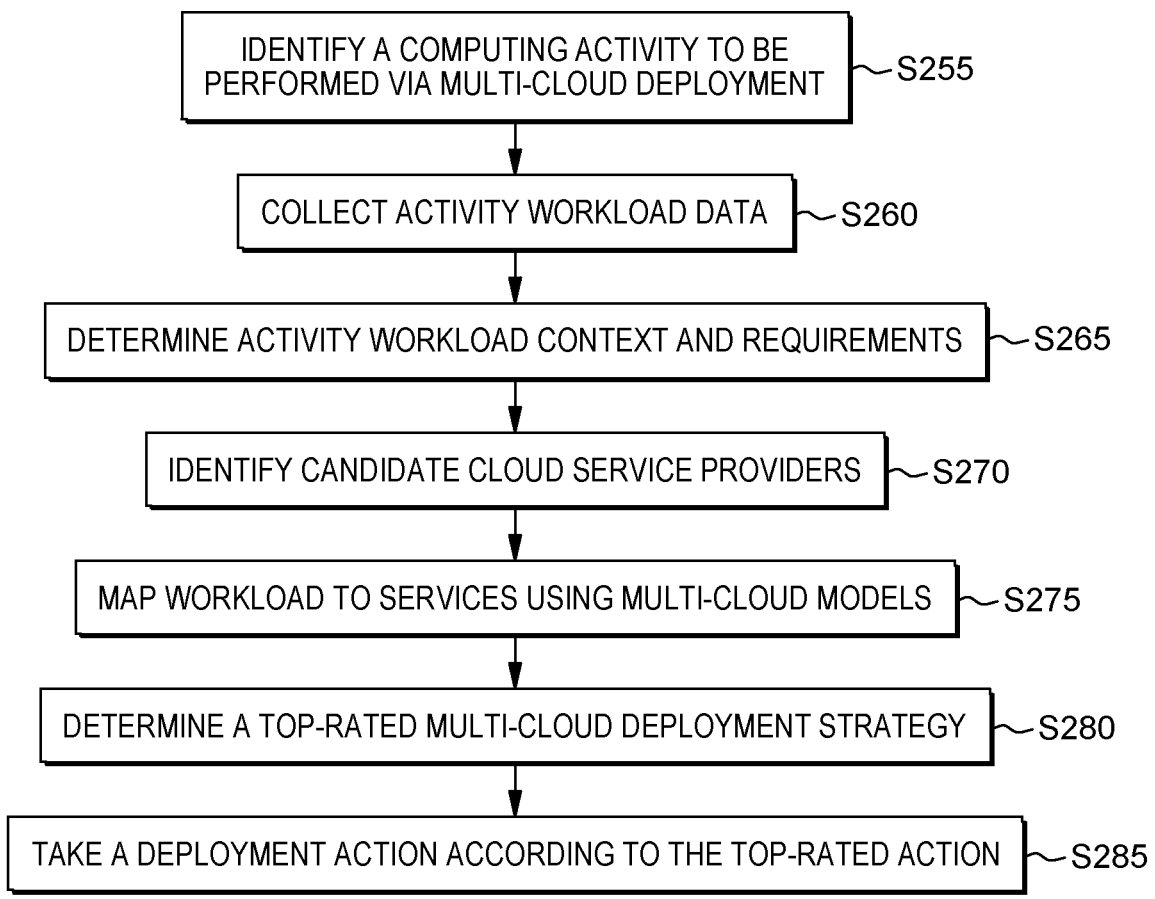
FIG. 2 is a flowchart showing a method performed, at least in part, by the first embodiment system.
Figure 3:
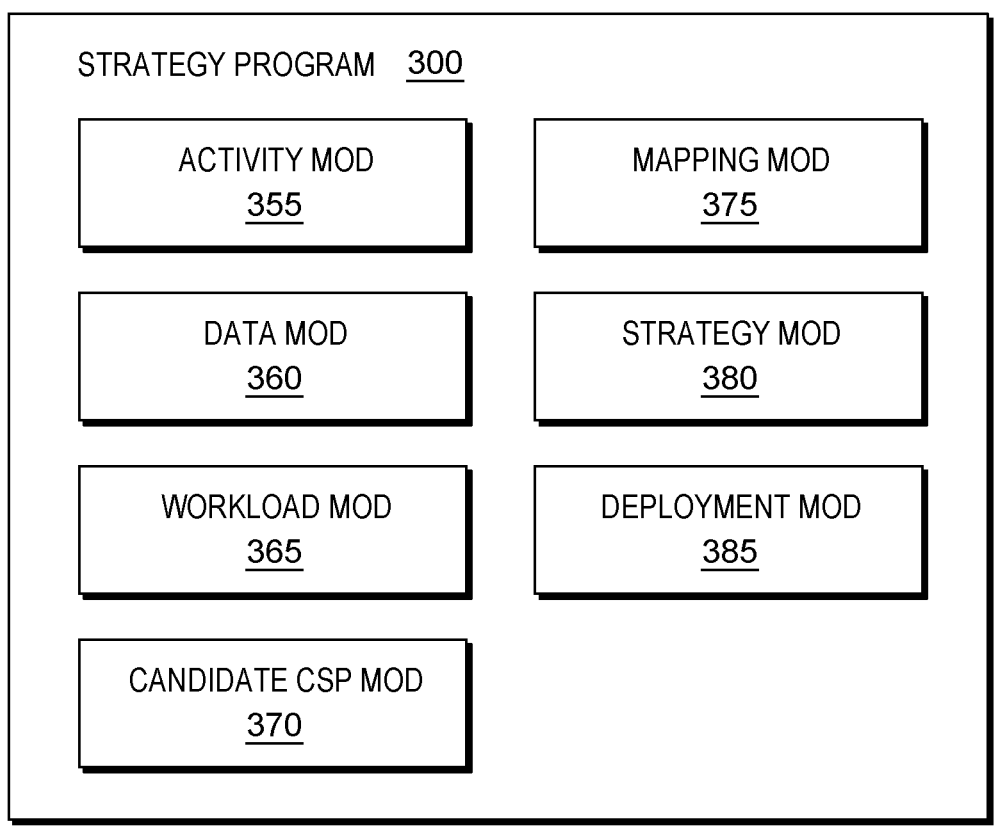
FIG. 3 is a schematic view of a machine logic (for example, software) portion of the first embodiment system.
Figure 4:
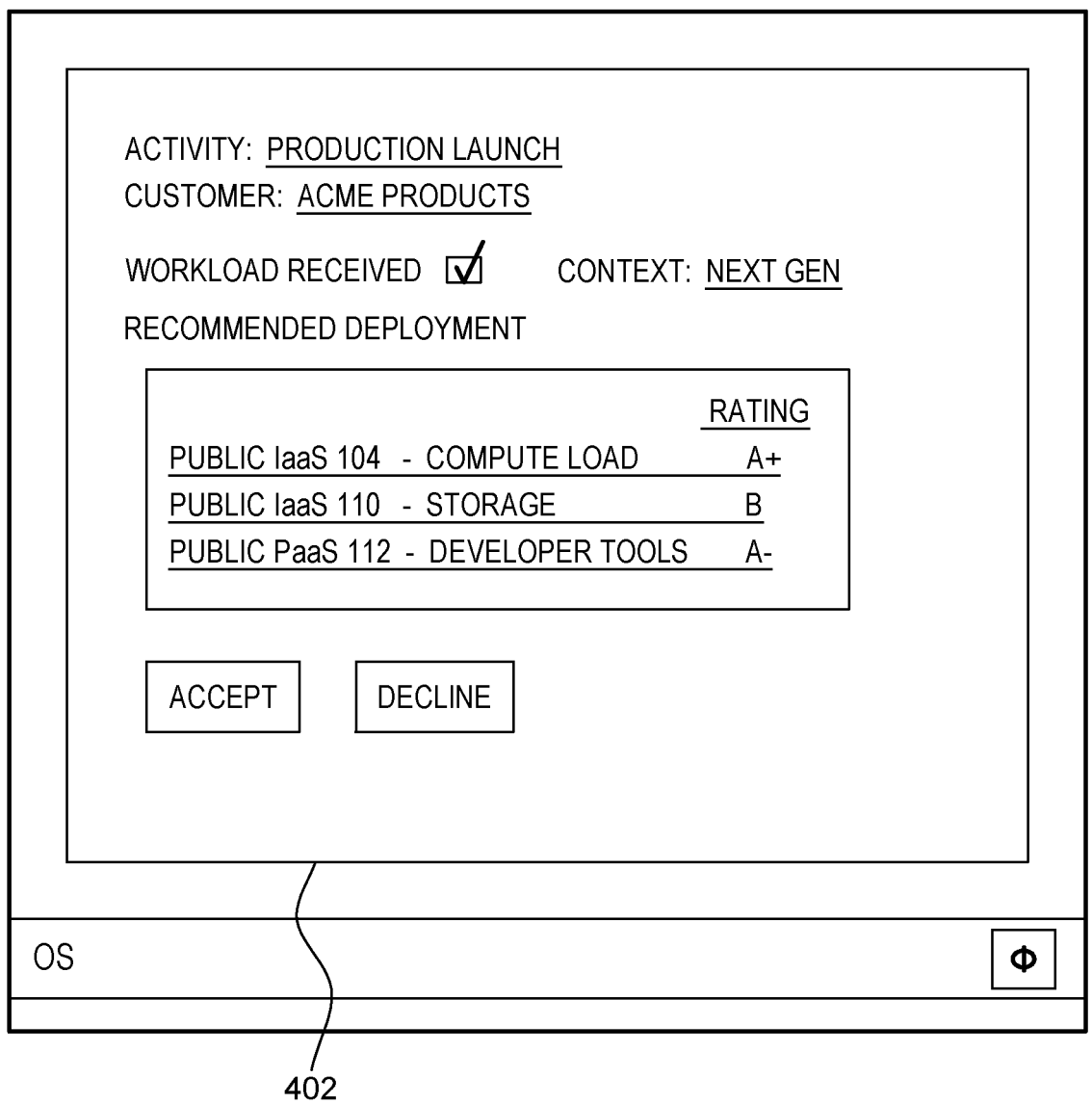
FIG. 4 is a screenshot view generated by the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). FIG. 4 shows computer screen 400 with output from multi-cloud deployment strategy program 300 (FIG. 1) in screenshot 402.

Processing begins at step S255, where activity module ("mod") 355 identifies a computing activity to be performed via multi-cloud deployment. Computing activities are defined by user input and workload definitions for performing the activity including contextual clues are input to an activity storage location, such as activity workload store 302 (FIG. 1). Inputs may be received from various sources such as administrative support, developers, and quality assurance. For example, client sub-system 106 enters activity data for storage that is descriptive of a particular activity workload via input module 107. According to some embodiments of the present invention, the identified computing activity is communicated to the strategy program when the activity is about to begin. That is, strategy program may operate to determine a multi-cloud deployment strategy at the time that an activity begins in real time. As shown in screenshot 402, the computing activity is a production launch.

Processing proceeds to step S260, where data mod 360 collects activity workload data. Upon identifying the activity, whether by instruction or by other triggering event, the data module collects relevant activity workload data from the activity storage location such as activity workload store 302. Workload data may include workload requirements related to various resources for performing the activity and/or historic workload details from previous performance of the identified activity and/or similar activities.

Processing proceeds to step S265, where workload mod 365 determines activity workload context and requirements. The workload module analyzes the collected activity workload data to derive workload context and other requirements relevant to selection of appropriate cloud-based resources. Further, the workload context and requirements provide a basis for establishing ranking criteria of identified optional multi-cloud deployment strategies. As shown in screenshot 402, example activity workload data was received, and workload context is identified as next generation product release.

Processing proceeds to step S270, where candidate cloud service provider (CSP) mod 370 identifies a set of CSPs within the multi-cloud computing environment. Based on the derived workload context and other requirements, the CSP module identifies cloud services that may be applied to handle the identified activity workload. In the example screenshot 402, some of the candidate CSPs are Public IaaS 104, Public IaaS 110, and Public PaaS 112 (FIG. 1). Workload requirements may include: (i) server geographic location; (ii) performance ratings; (iii) service availability record; and/or (iv) cost.

Processing proceeds to step S275, where mapping mod 375 maps the activity workload to services using relevant multi-cloud models. Multi-cloud deployment models are used for mapping the activity workload to various candidate CSPs for determining a set of multi-cloud deployment strategies suitable for handling identified activity workload components. Some embodiments of the present invention update and/or train the deployment models based on feedback from earlier-defined multi-cloud deployments. In an example embodiment below, a feedback analyzer manages feedback processing and subsequent reinforcement learning and/or model training.

Processing proceeds to step S280, where strategy mod 380 determines a top-rated multi-cloud deployment strategy. By application of ranking criteria to the set of multi-cloud deployment strategies suitable for handling the identified activity workload, a ranked set of strategies is generated. The number of ranked strategies will vary by user definition as well as by resulting count of strategies generated. The top-rated multi-cloud deployment strategy presented in screenshot 402 includes the use of various CSPs to handle compute load, storage load, and developer tools with corresponding user ratings A+, B, and A−. Alternatively, cloud component ratings are numeric, and ranking is within a given numeric range of good to bad. According to some embodiments of the present invention, rating may be shown for overall ratings in addition to individual user ratings. As discussed in more detail below, when the recommended deployment strategy is accepted or rejected, the relevant multi-cloud models are updated with user feedback that may revise the user and overall ratings associated with particular services and service providers. According to some embodiments of the present invention, the rating of cloud deployment strategies involves threshold performance levels and/or estimated cost reliability values according to user feedback.

Processing ends at step S285, where deployment mod 385 takes a deployment action according to the top-rated action. In this example, taking a deployment action includes automatically initiating the performance of the activity as defined by the top-rated multi-cloud deployment strategy. Alternatively, the top-rated strategy is presented to a user for initiating or for approval to proceed. The top-rated strategy may be presented with other alternative strategies. According to some embodiments of the present invention, the presentation of the strategy includes a description of the strategy and how the activity workload will be carried out. According to some embodiments of the present invention, user feedback is received after deployment and/or after performance of the identified activity for use in improving activity and service mapping models by way of machine learning processes.

Further embodiments of the present invention are discussed in the paragraphs that follow and later with reference to FIGS. 5 and 6.

Efficient deployment involves more than an evaluation of the potential price of services but takes into account different perspectives based on the type of user activity, type of business, and/or geographical considerations. With respect to performance, when available choices and/or cultural perspectives are considered, the level of performance in an activity may be more valuable than the price or even the deployment geography may be more important to a user. For example, considering geographic differences in how data privacy is managed and the current data maintenance rules, the deployment strategy rating may emphasize data privacy and maintenance rules.

Further with regard to efficient cloud services deployment, geographic priorities may be of higher importance in some circumstances. If any activity workload has geographic priorities to deploy services in a particular geographic region, the disclosed system will take into account certain inputs related to the geographic priorities. As for security, occasionally data privacy standards of the cloud service provider are of particular interest to the user. Also, security aspects among cloud services and/or cloud components and dynamic security provisioning based on activity workload context may play a role in identifying the preferred cloud component/service deployment strategy.

Finally, interoperability of cloud services and components within the activity workload may be analyzed to deliver the preferred cloud component/service deployment strategy.

Some embodiments of the present invention are directed to a process having certain aspects that may include: (i) the cloud service seeker may be responsible for market research and on boarding and/or consuming the cloud service provided; (ii) the proposed system is a plug and play service where the organizational users can browse through this secured gateway/path connected to org network to perform market research about cloud service providers with combination as multi cloud service; (iii) the users can upload an excel file including specific requirements into the plug and play placeholder where an artificial intelligence (AI) enabled service analyzes the file to parse the user requirements and cluster them or classify them for multi-cloud deployment based on user inputs and/or expressed need; (iv) the activity workload analyzer takes input from the user and granularizes the workload into a set of attributes defining workload components; (v) the activity workload analyzer tags the activity based on user context and classifies common workload attributes across different contexts; (vi) the cloud service provider registry and evaluation engine uses the input parameters to map the cloud service component with various identified workload attributes and to identify common cloud components; and/or (vii) evaluation engine maps the cloud components across cloud services to provide a multi-cloud deployment strategy based on the input attributes of the activity and corresponding workload, including, for example, organizational attributes satisfying the need of an owning organization.

According to some embodiments of the present invention, the disclosed system may further direct the user during market research activities by not only displaying the web search results of various identified cloud service providers but also providing a comparison chart and/or metrics.

Some embodiments of the present invention are directed to saving, exporting, and/or importing the comparison charts and/or metrics associated with the various identified cloud service providers. These charts and/or metrics may be made available to other IT users or managers or architects for approval or procurement or it can be context driven with security rules imposed. A graphical user interface manages the approvals and comments of the deployment strategy along with performing further AI mining and stores the additional information until the recommended cloud service are procured/subscribed.

According to some embodiments of the present invention, the output may be displayed in a diagram and/or with the consumption data from the relevant organization. The reinforcement learning occurs based on the recommendation to improve the existing learning models. After a cloud service is procured and while in use certain events may occur, such as the user requirements change, or the procured cloud service may have gaps in certain components or services identified via a problem ticketing system or through input received from system architects or IT managers. The disclosed system may automatically create a requirement mapping document for use in identifying a cloud service provider who provides the newly required or the improved service according to the feedback. In some embodiments, the disclosed system fetches a competent service provider to provide the desired service and accordingly notifies the user or organization users.

According to some embodiments of the present invention, the user can continue to use a primary cloud service provider while relying on another service provider for a few other specific needs that are identified by user input. In that way, the user or organization users are enabled to interact with the other cloud service provider as needed.

Some embodiments of the present invention are directed to establishing and/or recording a frequency of service provider failures to deliver according to a service level agreement (SLA). In that way, new service provider procurement includes the specified SLA requirements and a carefully drafted penalty for not meeting the needs is facilitated. According to some embodiments of the present invention, the disclosed system identifies when there are training issues that are leading to failure to deliver or missed SLAs and automatically creates a request for and/or fetches a cloud service provider offering self-service and frequent learning sessions.

In one implementation, digital twin simulation is used to analyze various generated models with the real time changes specified in the automatically created requirement. The digital twin will provide for analysis of gaps in performance and/or offerings.

Some embodiments of the present invention are directed to multi-cloud model metrics designed to have cost, other attribute metrics, validation of cloud service combinations, and ranking of cloud service combinations to generate the learning models using reinforcement learning.

Some embodiments of the present invention are directed to a process where multiple parameters in the multi-cloud model are twinned to automatically identify gaps in the services and scope at each level for different contexts and accordingly identify a cloud service provider that can resolve issues and/or comply with specified requirements.

Some embodiments of the present invention are directed to using virtual reality systems to view activity workloads across cloud components with various recommendations while validating each proposed deployment strategy according to specified organization policies and/or user-specified needs.

Figure 5:
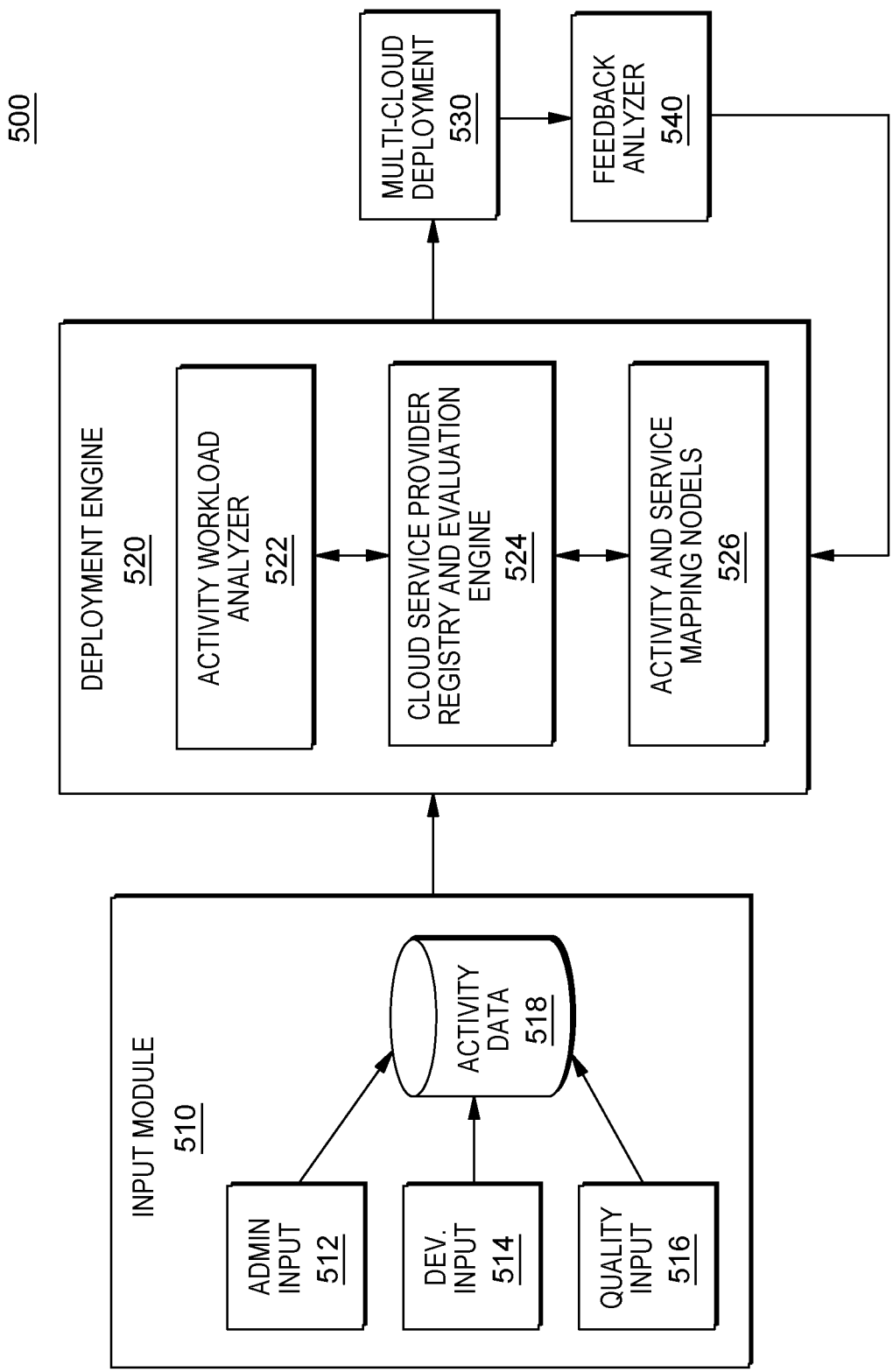
FIG. 5 is a schematic view of a second embodiment of a system according to the present invention.
Figure 6:
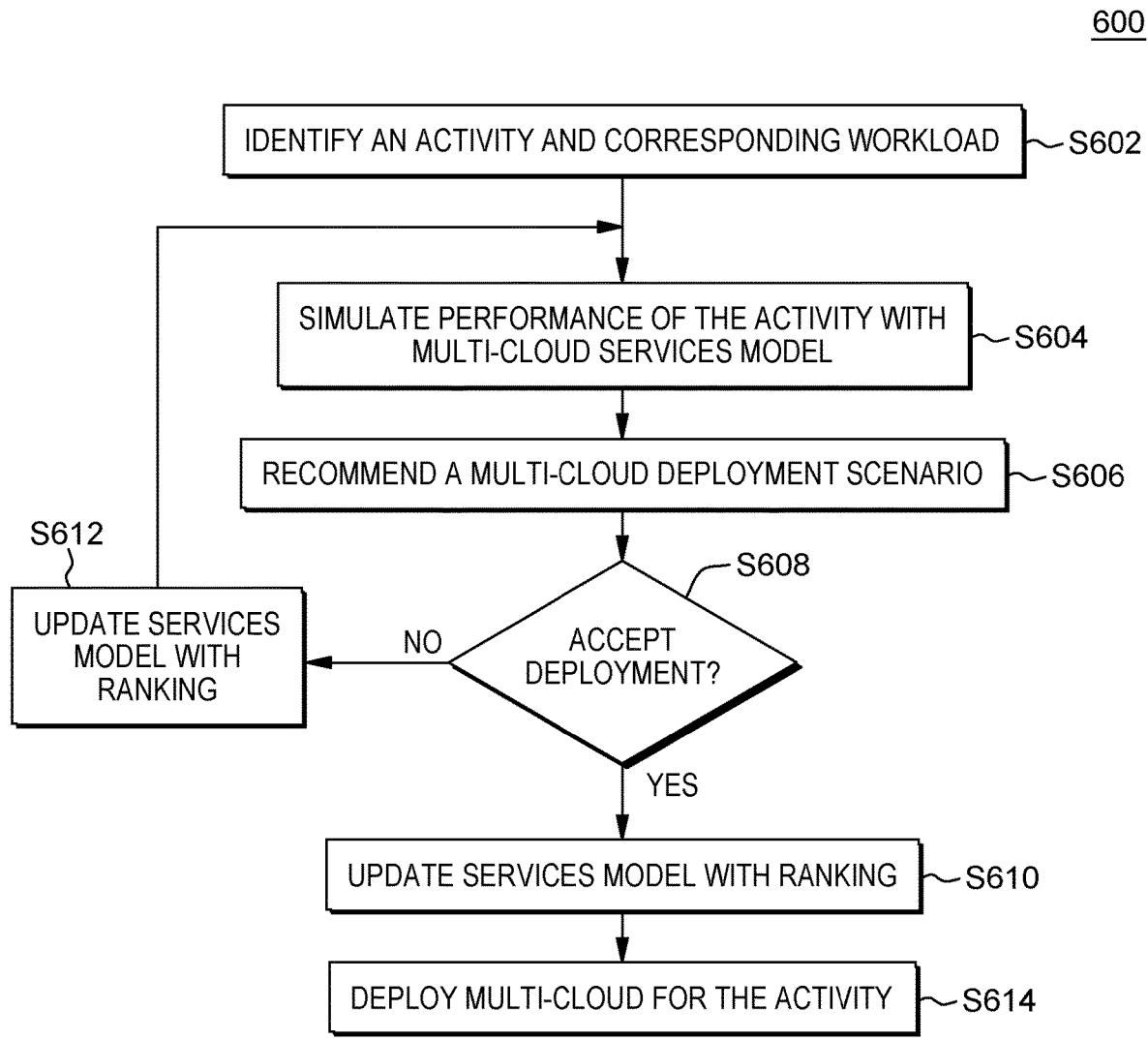
FIG. 6 is a flowchart showing a method performed, at least in part, by the second embodiment system.

FIG. 5 is a functional block diagram illustrating various portions of networked computers system 500, in accordance with one embodiment of the present invention, including: input module sub-system 510; administrator input module 512; developers input module 514; quality assurance input module 516; activity data store 518; deployment engine sub-system 520; activity workload analyzer module 522; cloud service provider engine 524; mapping models module 526; multi-cloud deployment module sub-system 530; and feedback analyzer sub-system 540.

FIG. 5 shows system 500 for performing at least some of the method steps of flowchart 600. FIG. 6 shows flowchart 600 depicting a second method according to the present invention. This method and associated system will now be discussed, over the course of the following paragraphs, with extensive reference to FIG. 5 (for the system) and FIG. 6 (for the method step blocks).

Processing begins with step S602, where the deployment engine 520 identifies an activity and corresponding workload. Identification of an activity may be performed by receipt of an activity request input from a user. Alternatively, an activity may be identified by recognizing a user context for beginning the activity. Regardless of how the activity is identified, the workload data for the activity is collected from an activity store, such as activity data store 518. Workload data may include context clues for use when analyzing the activity workload for cloud services determinations.

According to some embodiments of the present invention, input module 510 serves to collect and/or incorporate inputs received for parameters including service availability record, projected cost, performance, and/or geographic preferences. These inputs are received from admin input module ("mod") 512, developer input mod 514, and quality assurance (QA) mode 516. Further, activities and corresponding workloads are generated according to inputs received. The activity data, including parameters input are stored in activity data store 518.

Further, deployment engine 520 operates to process activity-specific data available in activity data store 518. Activity workload analyzer 522 performs analytics on activity workloads considering workload need, component consumed, user profile tagging, component interaction, API calls, component sustainability, and/or resiliency. The analyzer 522 may further provide the granular information for determining the cloud component needed using a drill down approach for user analysis. Along with analyzing the proposed workload or the real-time activity workload, cloud service provider engine 524 performs registry and evaluation operations to map the cloud service components with various identified attributes of the workload and to identify common cloud components. In that way, activity and service mapping models module 526 provides a preferred multi-cloud deployment strategy based on the input attributes, including, for example, organizational attributes satisfying the need of an owning organization.

Processing proceeds to step S604, where deployment engine 520 simulates performance of the activity with one or more multi-cloud services models. Multi-cloud deployment module 530 identifies the preferred multi-cloud deployment strategy to perform deployment actions including notice, recommendations, and/or initiating cloud service provider deployments according to the preferred multi-cloud deployment strategy.

Processing proceeds to step S606, where multi-cloud deployment module 530 recommends a multi-cloud deployment scenario for performing the identified activity.

Processing proceeds to step S608, where feedback analyzer 540 receives acceptance or rejection of the recommended deployment strategy. Upon taking one or more deployment actions, user feedback is collected for use in refining the operation of the deployment engine via reinforcement learning for improved modelling for generating a multi-cloud deployment strategy. If the deployment strategy is rejected, processing follows the "NO" branch to step S612. If the deployment strategy is accepted, processing follows the "YES" branch to step S610.

Following the "NO" branch, processing proceeds to step S612, where deployment engine 520 relevant services models are updated according to rejection feedback and may include updating the ranking of the recommended services. Processing returns to step S604 to simulate performance of the activity with one or more updated multi-cloud services models.

Following the "YES" branch, processing proceeds to step S610, where relevant services models are updated according to acceptance feedback and may include updating the ranking of the recommended services.

Processing ends with step S614, where multi-cloud deployment module deploys the recommended multi-cloud deployment strategy. Additionally, feedback analyzer may receive feedback on the deployment in particular after the identified activity is performed. Feedback is input into deployment engine 520 for improving model performance via machine learning processes.

Some embodiments of the present invention are directed to processing activity workloads to recommend a best possible solution and time frame to execute the activity workload. Further, some embodiments of the present invention are directed to creating a deployment diagram with context defined by the specified activity. Also, some embodiments of the present invention tag a choice for best option in a defined activity according to the profile of the user performing the activity, whether a developer, quality assurance personnel, or administrative personnel. The preferred multi-cloud deployment strategy is determined after creating different models of mapping of potential recommendations and activity workload.

Some embodiments of the present invention are directed to dynamic cost determination based on activity workload analysis. The cost determination is calculated in a multi cloud environment to deploy needed services using a most efficient or otherwise preferred cloud service deployment.

Some embodiments are directed to a method for real time cost effective multi cloud deployment recommendations based on an activity workload. Processing includes: (i) comparing cloud providers based on infrastructure and platform but also mainly considering activity workload needs, which could be any combination such as less infrastructure but different platforms, multiple infrastructures and multiple platforms, etc.; (ii) wherein activity workload analyzer will perform analytics on activity workload considering workload need, component consumed, user profile tagging, component interaction, API calls, component sustainability, resiliency and other attributes and provide the granular information to derive cloud component need by drill down approach for user analysis; (iii) wherein the real time digital twin based simulation taking input of multiple parameters and will be providing the validation of cost/security/privacy/performance metrics for a multi-cloud model (MCM); (iv) wherein the MCM metrics are not only designed to have cost and other attribute metrics but also validation and ranking of service combination too to generate the learning models using reinforcement learning; (v) wherein the multiple parameters in MCM are also auto recommend the gaps and scope at each level for different personas and accordingly identify a provider who can accommodate them; (vi) wherein the system can make use of virtual reality to view the activity workload across cloud components with different recommendations and to validate the scenario as per applied organization policies and needs.

Some embodiments of the present invention are directed to specific details in which a system determines a method for activity workload based real time cost effective multi cloud deployment recommendation.

Some embodiments of the present invention are directed to a step of comparing cloud providers based on infrastructure and platform but also mainly considering customer activity workload needs which could be any combination such as less infrastructure but different platforms, multiple infrastructures and multiple platforms, etc.

Some embodiments of the present invention are directed to a step wherein activity workload analyzer will perform analytics on activity workload considering workload need, component consumed, user profile tagging, component interaction, API calls, component sustainability, resiliency and other attributes and provide the granular information to derive cloud component need by drill down approach for user analysis.

Some embodiments of the present invention are directed to a step wherein the real-time digital-twin based simulation taking input of multiple parameters and providing the validation of cost, security, privacy, and/or performance metrics for multi-cloud models.

Some embodiments of the present invention are directed to a step wherein the MCM metrics is not only designed to have cost and other attribute metrics but also validation and ranking of service combination too to generate the learning models using reinforcement learning.

Some embodiments of the present invention are directed to a step wherein the multiple parameters in MCM are also twinned to auto recommend the gaps in service and/or scope of service at each level for different personas and accordingly identify a provider who can accommodate them.

Some embodiments of the present invention are directed to a step wherein the system can make use of virtual reality to view the activity workload across cloud component with different recommendation and validate the scenario as per applied organization policies and needs.

Some embodiments of the present invention are directed to a unique advantage with workload movement, user can deploy/redeploy services as needed wherever needed due to platform standardization and where the dynamic pricing based on activity workload has to be calculated in multi cloud environment to deploy needed services to save cost to users. More specifically, it would help users deploy their workload to the most efficient service provider as the default option, which would be very effective for non-production workloads such as development and/or test instances.

Some embodiments of the present invention are directed to user need-based activity workload and considering activity workload and its dependencies related cloud deployment recommendation with other attributes in consideration.

Some embodiments of the present invention may include one, or more, of the following features, characteristics and/or advantages: (i) not only compares cloud providers based on infrastructure (IaaS) and platform (PaaS) but also mainly considering the needs of the user activity workload that could be any combination of services, such as less infrastructure but different platforms, multiple infrastructures and multiple platforms; (ii) performs analytics on activity workload considering the needs of the workload, components consumed in performance of the activity, user profile tagging, component interaction, API calls, component sustainability, and/or resiliency and provides the granular information to derive cloud component needs using a drilling down approach for user analysis; and/or (iii) real time digital twin based simulation taking input of multiple parameters to provide the validation of cost, security, privacy, and/or performance metrics for the multi-cloud model (MCM).

Some Helpful Definitions Follow

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   identifying a computing activity to be performed by multi-cloud deployment, the computing activity identified by recognizing a user context indicative of a beginning of the computing activity;
   generating workload components defined by workload attributes of the computing activity;
   determining activity workload requirements for corresponding workload components;
   identifying a set of candidate cloud service providers for cloud services based on the activity workload requirements;
   mapping the workload components and the identified cloud services to the computing activity based on parameter inputs from the set of candidate cloud service providers, the mapping performed using multi-cloud deployment models;
   determining a top-rated multi-cloud deployment strategy based on the mapping;
   responsive to an approval action and user feedback regarding the top-rated multi-cloud deployment strategy, updating the multi-cloud deployment models in view of the approval action and the user feedback;
   responsive to the approval action being approval to proceed, deploying multi-cloud services to perform the identified computing activity according to the top-rated multi-cloud deployment action; and
   responsive to training issues regarding the top-rated multi-cloud deployment strategy, creating a request for a cloud service provider offering self-service and learning sessions.

2. The computer-implemented method of claim 1, further comprising:
   collecting activity workload data from user input while previously performing the identified computing activity.

3. The computer-implemented method of claim 2, wherein:
   the activity workload requirements are determined according to collected activity workload data and the generated workload components.

4. The computer-implemented method of claim 1, further comprising:
   storing activity workload data collected while a set of users each perform the identified computing activity.

5. The computer-implemented method of claim 4, further comprising:
   analyzing the stored activity workload data to determine the user context;
   wherein:
   determining activity workload requirements is performed according to the stored activity workload data and the user context.

6. The computer-implemented method of claim 1, further comprising:
   establishing ranking criteria for evaluating multi-cloud deployment strategies for handling the activity workload;
   wherein:
   determining a top-rated multi-cloud deployment strategy is based on the established ranking criteria.

7. A computer program product comprising a computer-readable storage medium having a set of instructions stored therein which, when executed by a processor, causes the processor to perform a method comprising:
   identifying a computing activity to be performed by multi-cloud deployment, the computing activity identified by recognizing a user context indicative of a beginning of the computing activity;
   generating workload components defined by workload attributes of the computing activity;
   determining activity workload requirements for corresponding workload components;
   identifying a set of candidate cloud service providers for cloud services based on the activity workload requirements;
   mapping the workload components and the identified cloud services to the computing activity based on parameter inputs from the set of candidate cloud service providers, the mapping performed using multi-cloud deployment models;
   determining a top-rated multi-cloud deployment strategy based on the mapping;
   responsive to an approval action and user feedback regarding the top-rated multi-cloud deployment strategy, updating the multi-cloud deployment models in view of the approval action and the user feedback;
   responsive to the approval action being approval to proceed, deploying multi-cloud services to perform the identified computing activity according to the top-rated multi-cloud deployment action; and
   responsive to training issues regarding the top-rated multi-cloud deployment strategy, creating a request for a cloud service provider offering self-service and learning sessions.

8. The computer program product of claim 7, further comprising:
   collecting activity workload data from user input while previously performing the identified computing activity.

9. The computer program product of claim 7, further comprising:
   storing activity workload data collected while a set of users each perform the identified computing activity.

10. The computer program product of claim 9, further comprising:
    analyzing the stored activity workload data to determine the user context;
    wherein:
    determining activity workload requirements is performed according to the stored activity workload data and the user context.

11. The computer program product of claim 7, further comprising:
    establishing ranking criteria for evaluating multi-cloud deployment strategies for handling the activity workload;
    wherein:
    determining a top-rated multi-cloud deployment strategy is based on the established ranking criteria.

12. A computer system comprising:
    a processor set; and
    a computer readable storage medium;
    wherein:

the processor set is structured, located, connected, and/or programmed to run program instructions stored on the computer readable storage medium; and the program instructions which, when executed by the processor set, cause the processor set to perform a method comprising:

identifying a computing activity to be performed by multi-cloud deployment, the computing activity identified by recognizing a user context indicative of a beginning of the computing activity;

generating workload components defined by workload attributes of the computing activity;

determining activity workload requirements for corresponding workload components;

identifying a set of candidate cloud service providers for cloud services based on the activity workload requirements;

mapping the workload components and the identified cloud services to the computing activity based on parameter inputs from the set of candidate cloud service providers, the mapping performed using multi-cloud deployment models;

determining a top-rated multi-cloud deployment strategy based on the mapping;

responsive to an approval action and user feedback regarding the top-rated multi-cloud deployment strategy, updating the multi-cloud deployment models in view of the approval action and the user feedback;

responsive to the approval action being approval to proceed, deploying multi-cloud services to perform the identified computing activity according to the top-rated multi-cloud deployment action; and responsive to training issues regarding the top-rated multi-cloud deployment strategy, creating a request for a cloud service provider offering self-service and learning sessions.

13. The computer system of claim 12, wherein the program instructions further cause the processor set to perform the method comprising:

collecting activity workload data from user input while previously performing the identified computing activity.

14. The computer system of claim 13, wherein the activity workload requirements are determined according to collected activity workload data and the generated workload components.

15. The computer system of claim 12, wherein the program instructions further cause the processor set to perform the method comprising:

storing activity workload data collected while a set of users each perform the identified computing activity.

16. The computer system of claim 15, wherein the program instructions further cause the processor set to perform the method comprising:

analyzing the stored activity workload data to determine the user context;

wherein:

determining activity workload requirements is performed according to the stored activity workload data and the user context.

17. The computer system of claim 12, wherein the program instructions further cause the processor set to perform the method comprising:

establishing ranking criteria for evaluating multi-cloud deployment strategies for handling the activity workload;

wherein:

determining a top-rated multi-cloud deployment strategy is based on the established ranking criteria.

* * * * *